(12) United States Patent
Nakamura et al.

(10) Patent No.: US 6,866,834 B2
(45) Date of Patent: Mar. 15, 2005

(54) NOX REDUCTION CATALYST AND NOX REDUCTION SYSTEM

(75) Inventors: Masanori Nakamura, Kanagawa (JP); Katsuo Suga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 272 days.

(21) Appl. No.: 10/077,791

(22) Filed: Feb. 20, 2002

(65) Prior Publication Data

US 2002/0192128 A1 Dec. 19, 2002

(30) Foreign Application Priority Data

Mar. 12, 2001 (JP) .......................................... 2001-069384

(51) Int. Cl.[7] .......................... B01J 23/02; B01J 23/58; B01J 23/63

(52) U.S. Cl. ................ 423/239.1; 423/213.5; 423/244.1; 502/304; 502/325; 502/328; 502/330; 502/339; 502/340; 502/344; 502/349

(58) Field of Search ................ 502/304, 325, 502/328, 330, 339, 340, 344, 349

(56) References Cited

U.S. PATENT DOCUMENTS

| | | | |
|---|---|---|---|
| 4,714,694 A | * 12/1987 | Wan et al. | 502/304 |
| 5,254,519 A | * 10/1993 | Wan et al. | 502/252 |
| 5,753,580 A | * 5/1998 | Hayashi et al. | 502/304 |
| 5,888,464 A | 3/1999 | Wu et al. | |
| 6,083,868 A | * 7/2000 | Yoshida et al. | 502/304 |
| 6,294,140 B1 | * 9/2001 | Mussmann et al. | 423/213.5 |
| 6,348,430 B1 | * 2/2002 | Lindner et al. | 502/304 |
| 6,468,484 B1 | * 10/2002 | Dou et al. | 423/213.2 |
| 6,517,784 B1 | * 2/2003 | Iizuka et al. | 422/177 |
| 6,524,992 B2 | * 2/2003 | Mussmann et al. | 502/304 |
| 2003/0216254 A1 | * 11/2003 | Takeshima et al. | 502/304 |

FOREIGN PATENT DOCUMENTS

| | | |
|---|---|---|
| EP | 0 771 584 A1 | 5/1997 |
| EP | 0 790 216 A2 | 8/1997 |
| EP | 0 885 650 | * 12/1998 |
| EP | 0 993 861 | * 4/2000 |
| JP | 5-168860 | 7/1993 |
| JP | 7-51544 | 2/1995 |
| JP | 9-173839 | 7/1997 |
| WO | WO 98/03251 | * 1/1998 |

* cited by examiner

*Primary Examiner*—Christina Johnson
(74) *Attorney, Agent, or Firm*—Foley & Lardner LLP

(57) ABSTRACT

A NOx reduction catalyst for exhaust gas discharged from an automotive internal combustion engine operable in a lean region and in a range including a stoichiometric region and a rich region. The NOx reduction catalyst comprises a catalytic noble metal. Additionally, an oxygen adsorbable and releasable material is provided carrying at least a part of the catalytic noble metal. In this catalyst, the catalytic noble metal carried on the oxygen adsorbable and releasable material adsorbs SOx in the exhaust gas, in a form of at least one of sulfate and sulfite.

22 Claims, 4 Drawing Sheets

NOX REDUCTION CATALYST AND NOX REDUCTION SYSTEM

BACKGROUND OF THE INVENTION

This invention relates to improvements in NOx reduction catalyst and NOx reduction system for reducing NOx in exhaust gas discharged from a combustion device such as an internal combustion engine, a combustor, a boiler or the like, and more particularly the NOx reduction catalyst and NOx reduction system for reducing NOx as well as hydrocarbons (HC), carbon monoxide (CO) and nitrogen oxides (NOx) contained in exhaust gas discharged from an automotive internal combustion engine in such a manner that NOx can be particularly effectively reduced in a lean region of exhaust gas and that SOx can be adsorbed to the NOx reduction catalyst in a range including a stoichiometric region and a rich region.

In recent years, low fuel consumption automotive vehicles have been required from the viewpoints of petroleum resource exhaustion problem and warm-up problem for the earth. In this regard, attentions have been paid on development of lean-burn automotive engines. In the lean-burn automotive engines, exhaust gas (atmosphere) becomes in a lean region in which air-fuel ratio of exhaust gas is lean as compared with a stoichiometric level, during lean-burn operation. In case that a usual thee-way catalyst is used in such a lean region of exhaust gas atmosphere, reduction of NOx can become insufficient under the effect of excessive oxygen. Consequently, it has been eagerly desired to develop exhaust gas purifying catalysts which can effectively reduce NOx even in the presence of excessive oxygen.

In view of the above, a variety of exhaust gas purifying catalysts for reducing NOx in the lean region of exhaust gas have been proposed. An example of these exhaust gas purifying catalysts is disclosed in Japanese Patent Provisional Publication No. 5-168860, in which platinum (Pt) and lanthanum (La) are carried on a porous substrate so that NOx is trapped in the lean region of exhaust gas and released in a range including the stoichiometric region and the rich region.

SUMMARY OF THE INVENTION

However, drawbacks have been encountered in conventional exhaust gas purifying catalysts including one disclosed in Japanese Patent Provisional Publication No. 5-168860 as set forth below. Sulfur is contained in fuel and lubricating oil, and therefore this sulfur is discharged in the form of oxide into exhaust gas. This sulfur poisons a NOx adsorbing or trapping material in the conventional exhaust gas purifying catalyst, thereby lowering the NOx adsorbing ability of the NOx adsorbing material. This is called a sulfur-poisoning.

Such sulfur-poisoning cannot be avoided as far as sulfur is contained in any forms in exhaust gas, and therefore it has been an important subject to effectively release sulfur adhered onto the catalyst. Hitherto, attentions have been paid on the sulfur-poisoning made on the NOx adsorbing material. In this regard, it has been proposed to combine a plurality of NOx reducing agents as disclosed in Japanese Patent Provisional Publication No. 7-51544, and to highly disperse the NOx reducing agent as disclosed in Japanese Patent Provisional Publication No. 9-173839, in order to facilitate releasing the sulfur-poisoning of the NOx adsorbing material.

Additionally, as a result of studying the above subjects, the present inventors have found and obtain a knowledge that it is effective to release the sulfur-poisoning of a catalytic noble metal (serving as an active site) of a catalyst as compared with to improve the NOx adsorbing material. This means that a reaction for releasing sulfur from the NOx adsorbing material cannot sufficiently occur if the sulfur-poisoning of the catalytic noble metal as the active site is not released.

The present invention has been made in view of the above subject and the knowledge and is intended to provide a NOx reduction catalyst and a NOx reduction system which are arranged that the sulfur-poisoning can be readily released. As a result of repeating efforts to meet the subject, the present inventors have found that the sulfur-poisoning can be effectively released by preventing $SO_2$ and/or the like from its sulfidization under the action of oxygen released from an oxygen absorbable and releasable material when oxygen is insufficient. This leads to completion of the present invention.

It is, therefore, an object of the present invention to provide improved NOx reduction catalyst and NOx reduction system which can effectively overcome drawbacks encountered in conventional NOx reduction catalysts and NOx reduction systems.

Another object of the present invention is to provide an improved NOx reduction catalyst and NOx reduction system in which a sulfur-poisoning of the NOx reduction catalyst and NOx reduction system can be readily released.

A further object of the present invention is to provide an improved NOx reduction catalyst and NOx reduction system in which an oxygen adsorbable and releasable material releases oxygen when oxygen is insufficient, which oxygen prevents $SO_2$ and/or the like from their sulfidization.

A still further object of the present invention is to provide an improved NOx reduction catalyst and NOx reduction system in which $SO_2$ and/or the like are adsorbed in the form of sulfate and/or sulfide to a catalytic noble metal under the action of oxygen released from an oxygen adsorbable and releasable material.

An aspect of the present invention resides in a NOx reduction catalyst for exhaust gas discharged from a combustion device operable in a lean region and in a range including a stoichiometric region and a rich region. The NOx reduction catalyst comprises a catalytic noble metal. Additionally, an oxygen adsorbable and releasable material is provided carrying at least a part of the catalytic noble metal. In the above catalyst, the catalytic noble metal carried on the oxygen adsorbable and releasable material adsorbs SOx in the exhaust gas, in a form of at least one of sulfate and sulfite.

Another aspect of the present invention resides in a NOx reduction catalyst for exhaust gas discharged from a combustion device operable in a lean region and in a range including a stoichiometric region and a rich region. The NOx reduction catalyst comprises a first catalytic coat layer including a catalytic noble metal, and an oxygen adsorbable and releasable material which carries at least a part of the catalytic noble metal, wherein the catalytic noble metal carried on the oxygen adsorbable and releasable material adsorbs SOx in the exhaust gas, in a form of at least one of sulfate and sulfite. Additionally, a second catalytic coat layer is formed on the first catalytic coat layer, exhaust gas flowing though a position nearer to the second catalytic coat layer than to the first catalytic coat layer. The second catalytic coat layer includes a catalytic noble metal, and an oxygen adsorbable and releasable material which carries at least a part of the catalytic noble metal, wherein the catalytic noble metal carried on the oxygen adsorbable and releasable material adsorbs SOx in the exhaust gas, in a form of at least one of sulfate and sulfite. In the above catalyst, the oxygen adsorbable and releasable material included in the first catalytic coat layer is larger in amount than the oxygen adsorbable and releasable material included in the second catalytic coat layer.

A further aspect of the present invention resides in a NOx reduction catalyst for exhaust gas discharged from a combustion device operable in a lean region and in a range including a stoichiometric region and a rich region. The NOx reduction catalyst comprises a refractory inorganic substrate. At least one catalytic noble metal selected from the group consisting of platinum and rhodium is supported on the refractory inorganic substrate. A NOx adsorbing material which is at least one metal selected from the group consisting of barium and magnesium is supported on the refractory inorganic substrate. Additionally, an oxygen adsorbable and releasable material including ceria is supported on the refractory inorganic substrate, the oxygen adsorbable and releasable material carrying at least a part of the catalytic noble metal. In the above catalyst, the catalytic noble metal carried on the oxygen adsorbable and releasable material adsorbs SOx in the exhaust gas, in the form of at least one of sulfate and sulfite.

A still further aspect of the present invention resides in a NOx reduction catalyst for exhaust gas discharged from a combustion device operable in a lean region and in a range including a stoichiometric region and a rich region. The NOx reduction catalyst comprises a catalytic noble metal including platinum. Additionally, an oxygen adsorbable and releasable material is provided carrying at least a part of the catalytic noble metal The oxygen adsorbable and releasable material includes ceria which carries platinum in an amount ranging from 5 to 50% by weight of a whole amount of platinum contained in the NOx reduction catalyst. In the above catalyst, the platinum carried on the ceria adsorbs SOx in the exhaust gas, in a form of at least one of sulfate and sulfite.

A still further aspect of the present invention resides in a NOx reduction system for exhaust gas discharged from a combustion device operable in a lean region and in a range including a stoichiometric region and a rich region. The NOx reduction system comprises a NOx reduction catalyst including a catalytic noble metal, and an oxygen adsorbable and releasable material which carries at least a part of the catalytic noble metal, wherein the catalytic noble metal carried on the oxygen adsorbable and releasable material adsorbs SOx in the exhaust gas, in a form of at least one of sulfate and sulfite. Additionally, a device is provided for controlling an air-fuel (air/fuel) ratio of an air-fuel mixture to be supplied to the combustion device, within a range of not smaller than 15 in the lean region.

A still further aspect of the present invention resides in a NOx reduction system for exhaust gas discharged from a combustion device operable in a lean region and in a range including a stoichiometric region and a rich region. The NOx reduction system comprises an exhaust gas passageway through which exhaust gas from the combustion device flows. A NOx reduction catalyst is disposed in the exhaust gas passageway and includes a catalytic noble metal, and an oxygen adsorbable and releasable material which carries at least a part of the catalytic noble metal, wherein the catalytic noble metal carried on the oxygen adsorbable and releasable material adsorbs SOx in the exhaust gas, in a form of at least one of sulfate and sulfite. A device is provided for causing secondary air to flow into the exhaust gas passageway upstream of the NOx reduction catalyst in the range including the stoichiometric region and the rich region.

A still further aspect of the present invention resides in a method of reducing NOx in exhaust gas discharged from a combustion device which is operable in a lean region and in a range including a stoichiometric region and a rich region. The method comprises (a) providing the combustion device with a NOx reduction catalyst including a catalytic noble metal, and an oxygen adsorbable and releasable material which carries at least a part of the catalytic noble metal; and (b) causing exhaust gas to flow through the NOx reduction catalyst to allow the catalytic noble metal carried on the oxygen adsorbable and releasable material to adsorb SOx in the exhaust gas, in a form of at least one of sulfate and sulfite.

DETAILED DESCRIPTION OF THE INVENTION

Figure 1:
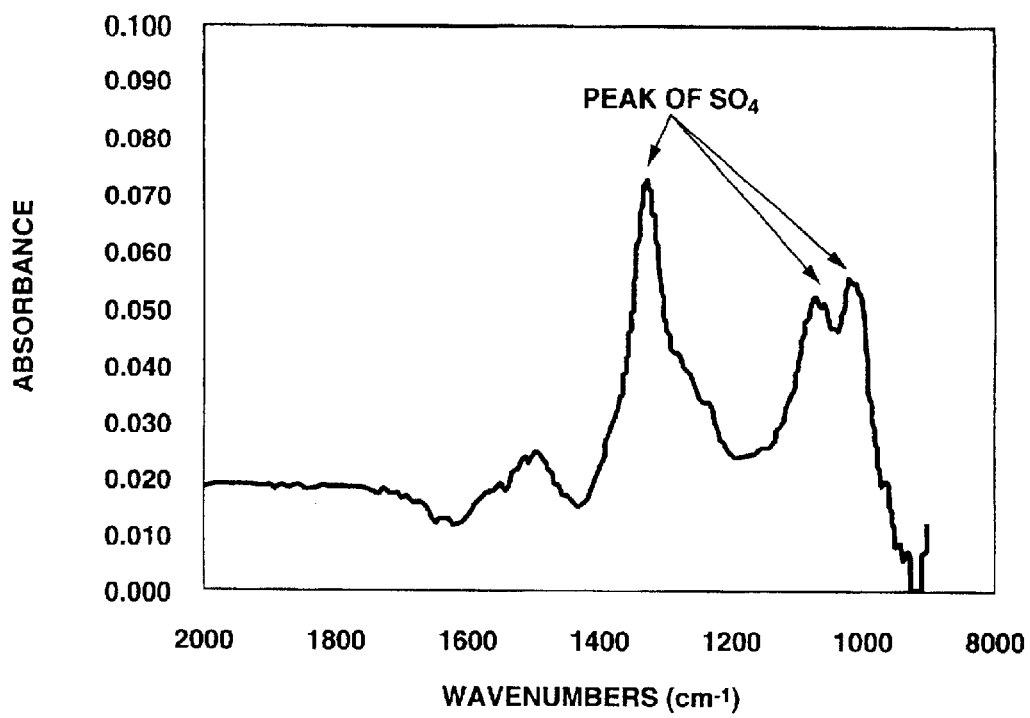
FIG. 1 is a graph of an infrared absorption spectrum showing peaks of sulfate.

According to the present invention, a NOx reduction catalyst is for exhaust gas discharged from a combustion device operable in a lean region and in a range including a stoichiometric region and a rich region. The NOx reduction catalyst comprises a catalytic noble metal (catalyst component). Additionally, an oxygen adsorbable and releasable material (catalyst component) is provided carrying at least a part of the catalytic noble metal. Here, the catalytic noble metal carried on the oxygen adsorbable and releasable material adsorbs SOx in the exhaust gas, in the form of at least one of sulfate and sulfite.

The combustion device is preferably an automotive internal combustion engine. In the lean region, exhaust gas discharged from the engine has an air-fuel ratio leaner (in fuel) than a stoichiometric value, in which the engine is supplied with air-fuel mixture having an air-fuel ratio leaner than the stoichiometric value. In the stoichiometric region, exhaust gas has a generally stoichiometric air-fuel ratio, in which the engine is supplied with air-fuel mixture having a generally stoichiometric air-fuel ratio. In the rich region, exhaust gas has an air-fuel ratio richer (in fuel) than the stoichiometric valve, in which the engine is supplied with air-fuel mixture having an air-fuel ratio richer than the stoichiometric value. The NOx reduction catalyst is disposed in an exhaust gas passageway of the engine, in which exhaust gas of the engine flows through the exhaust gas passageway to be discharged into the atmospheric air. It will be understood that, in the lean region, the concentration of oxidizing gas such as NOx is high relative to that of reducing gas such as HC and CO. It will be understood that the combustion device may be a gas turbine engine, a combustor, a furnace, a burner, a boiler or the like.

Here, usually $SO_2$ and the like (sulfur oxides) react with excessive oxygen to be adsorbed in the form of sulfate and/or sulfite onto the catalytic noble metal in the lean region. Almost whole $SO_2$ in exhaust gas makes its dissociative adsorption onto the catalytic noble metal (mainly Pt) to form sulfide in the range including the stoichiometric region and the rich region.

According to the present invention, at least a part of the catalytic noble metal is supported on the oxygen adsorbable and releasable material (typically $CeO_2$). Consequently, $SO_2$ can be adsorbed in the form of sulfate and/or sulfite onto the catalytic noble metal in the lean region similarly to the above. Additionally, in the range including the stoichiometric region and the rich region, oxygen is released from the oxygen adsorbable and releasable material, and therefore this oxygen reacts with $SO_2$ and the like and adsorbed in the form of sulfate and/or sulfite onto the catalytic noble metal carried on the oxygen adsorbable and releasable material, thereby preventing the catalytic noble metal from its sulfidization, as seen from FIG. 1.

In the specification of the present application, in the lean region, the amount of reducing gas such hydrocarbons (HC), carbon monoxide(CO), hydrogen (H and the like in exhaust gas is small as compared with that of oxidizing gas such as nitrogen oxides (NOx), sulfur oxides (SOx) and the like. In the rich region, the amount of the reducing gas such as HC, CO, $H_2$ and the like in exhaust gas is large as compared with the oxidizing gas such as NOx, SOx and the like.

An example of the catalytic noble metal is platinum (Pt). It will be understood that sulfur is readily releasable from Pt sulfate and Pt sulfite as compared from Pt sulfide. When sulfur is kept in the form of sulfate and/or sulfite in the rich region, releasing sulfur-poisoning can be accomplished at a low temperature and for a short time so that Pt can immediately act as active site, as compared with being kept in the form of Pt sulfide. It is to be noted that the above advantageous effects can be obtained only in case that the catalytic noble metal (Pt and/or the like) is carried on the oxygen adsorbable and releasable material. Another example of the catalytic noble metal is palladium (Pt) or the like; however, Pd may unavoidably tend to make its sintering upon making its sulfur-poisoning, and therefore Pt is suitable for the catalytic noble metal.

Further, in case that Pt is carried on the oxygen adsorbable and releasable material, a part of NOx in exhaust gas can be adsorbed on Pt. However, it is preferable to improve a NOx adsorbing ability of the NOx reduction catalyst in order to meet the recent strict exhaust gas emission regulations. For this purpose, the NOx reduction catalyst may include alkali metal, alkaline earth metal and/or rare earth metal, and/or any combination of alkali metal, alkaline earth metal and rare earth metal. As a result, the NOx reduction catalyst can adsorb NOx in the lean region and reduce the adsorbed NOx into nitrogen ($N_2$) in the range including the stoichiometric region and the rich region.

A strongly basic compound such as a compound of alkali metal or the like is usually subjected to strong sulfur-poisoning. However, even if the NOx reduction catalyst of the present invention is subjected to a sulfur-poisoning, first sulfur is released from Pt carried on the oxygen adsorbable and releasable material so as to restore Pt, and the adsorbing ability of a NOx adsorbing or trapping material can be restored under the action of the restored Pt, thereby making it possible very easily to release the sulfur-poisoning. Examples of the NOx adsorbing material or metal which has an ability of adsorbing or trapping NOx are barium (Ba), magnesium (Mg), sodium (Na), cesium (Cs), potassium (K) and/or the like. These metals are selected to be used in the NOx reduction catalyst according to a temperature range in which the NOx reduction catalyst is used. For example, the combination of barium and magnesium is appropriately used in a temperature range of from 200 to 400° C. The combination of barium, magnesium and sodium is appropriately used in a temperature range of from 250 to 450° C. The combination of barium, magnesium and cesium is appropriately used in a temperature range of from 250 to 500° C. The combination of barium, magnesium and calcium is used in a temperature range of from 300 to 550° C.

A further example of the catalytic noble metal is rhodium (Rh). In case that the rhodium is used as the catalytic noble metal in the NOx reduction catalyst, the NOx reduction efficiency can be improved when NOx adsorbed in the lean region is reduced in the range including the stoichiometric region and the rich region.

Figure 2:
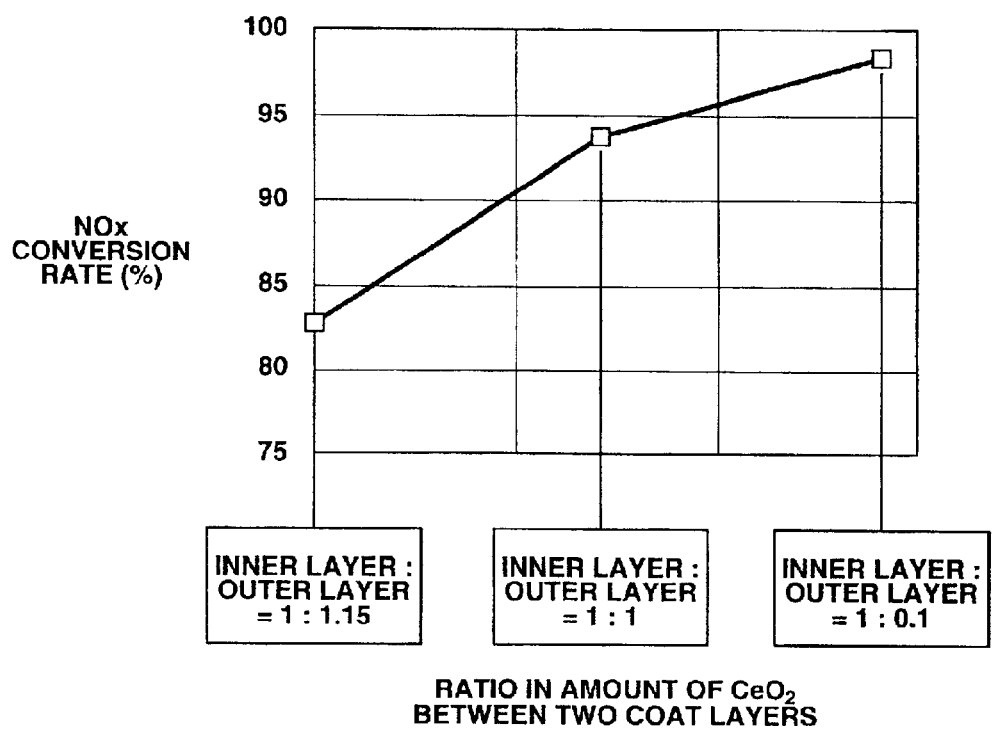
FIG. 2 is a graph showing a NOx conversion rate (%) in terms of a ratio in amount between $CeO_2$ in an inner catalytic coat layer of a NOx reduction catalyst and $CeO_2$ in an outer catalytic coat layer of the same catalyst.

The oxygen adsorbable and releasable material is very effective for releasing the sulfur-poisoning as discussed above; however, if the amount of the oxygen adsorbable and releasable material is too much, a reducing agent which is inherently to be used for reducing NOx unavoidably reacts with oxygen released from the oxygen adsorbable and releasable material when NOx is reduced in the range including the stoichiometric region and the rich region, thereby providing a fear of lowering the NOx reduction efficiency. In view of such problem, the NOx reduction catalyst is formed to have outer and inner catalytic (coat) layers which are located one upon another, the outer catalytic layer being located outside relative to the inner catalytic layer with respect to flow of exhaust gas. The outer catalytic layer is smaller in amount of the oxygen adsorbable and releasable material than the inner layer. This can suppress the amount of consumption of the reducing agent. As a result of this arrangement, oxygen necessary for causing $SO_2$ in exhaust gas to be adsorbed in the form of sulfate and/or sulfite in the rich region is supplied from the inner catalytic layer, while reduction of NOx is carried out by the outer catalytic layer. In this arrangement, it is preferable that Rh for reduction of NOx is contained in the outer catalytic layer, since a sufficient effect of Rh cannot be exhibited even in case that Rh is contained in the inner catalytic layer thereby wasting Rh. It is preferable that the oxygen adsorbable and releasable material contained in the outer catalytic layer and that in the inner catalytic layer are within a weight ratio range of from 0.01:0.99 to 1:1. If the amount of the oxygen adsorbable and releasable material contained in the inner layer is reduced less than that in the weight ratio range, a durability or NOx reduction efficiency (or NOx conversion rate) of the NOx reduction catalyst is lowered, as shown in FIG. 2.

It is to be noted that the NOx adsorbing material or metal (having the ability of adsorbing or trapping NOx) such as Ba unavoidably absorbs SOx as well as NOx. Accordingly, it is preferable that the NOx absorbing material and the catalytic noble metal such as Pt and/or Rh coexist with each other in the NOx reduction catalyst, in which, for example, at least a part of Pt is carried on ceria ($CeO_2$) to form a Pt/$CeO_2$ catalyst component. In this case, first the sulfur-poisoning of Pt is released to restore Pt/$CeO_2$, and subsequently the restored Pt/$CeO_2$ releases the sulfur-poisoning of the NOx adsorbing material by using hydrogen generated by a water gas shift reaction ($CO+H_2O \rightarrow CO_2+H_2$).

Here, it is particularly preferable that the amount of Pt carried on CeO$_2$ is within a range of from 5 to 50% by weight relative to the whole amount of Pt contained in the NOx reduction catalyst, in which such Pt carried on CeO$_2$ adsorbs SOx in exhaust gas in the form of sulfate and sulfite and therefore is effective for releasing the sulfur-poisoning. If the amount of Pt carried on CeO$_2$ is smaller than 5% by weight, the amount of Pt serving for releasing the sulfur-poisoning is too small to give rise to the water gas shift reaction thereby making it difficult to release the sulfur-poisoning throughout the whole NOx reduction catalyst. If the amount Pt carried on CeO$_2$ exceeds 50% by weight, the amount of Pt serving for releasing the sulfur-poisoning become larger; however, the reducing agent (such as CO and HC) for reducing the adsorbed NOx unavoidably reacts with oxygen released from CeO$_2$ before reduction of NOx, and therefore a reaction of conversion of from NOx to N$_2$ cannot proceed.

The NOx adsorbing material is selected according to a temperature condition in which the NOx adsorbing material is used. For example, Mg is effective as the NOx adsorbing material in case that the temperature at a position immediately upstream (with respect to flow of exhaust gas) of the NOx reduction catalyst is within a range of from 200 to 300° C.; Ba is effective in case that the temperature at the same position is within a range of from 250 to 400° C.; Na is effective in case that the temperature at the same position is within a range of from 300 to 450° C.; and Cs is effective in case that the temperature of the same position is within a range of from 300 to 500° C. These NOx adsorbing materials such as Mg, Ba, Na, Cs and the like may be carried on a single refractory inorganic material such as CeO$_2$, which makes it possible to maintain a good NOx adsorbing function throughout a wide temperature range.

The above-mentioned CeO$_2$ is contained in the NOx reduction catalyst, preferably in an amount ranging from 3 to 100 g per one liter of the substrate. If the amount of CeO$_2$ is smaller than 3 g per one liter of the substrate (for example, a monolithic substrate) or per one liter of the NOx reduction catalyst per se, releasing the sulfur-poisoning cannot be sufficiently accomplished. If the amount of CeO$_2$ exceeds 100 g per one liter of the substrate, the reducing agent (such as CO and HC) for reducing the adsorbed NOx unavoidably reacts with oxygen released from CeO$_2$ before reduction of NOx, and therefore the reaction of conversion of from NOx to N$_2$ may not proceed.

Additionally, the above-mentioned Pt and/or Rh are contained in the NOx reduction catalyst, preferably in an amount ranging from 1.4 to 4.3 g per one liter of the substrate. If the amount of Pt and/or Rh is smaller than 1.4 g per one liter of the substrate or per one liter of the NOx reduction catalyst per se, the performance of the NOx reduction catalyst cannot be sufficient. Even if the amount of Pt and/or Rh is larger than 4.3 g per one liter of the substrate, the performance of the NOx reduction catalyst is saturated so that a production cost for each NOx reduction catalyst may rise.

The above-mentioned CeO$_2$ is combined with zirconium (Zr) to form a double (compound) oxide. In order to release the sulfur-poisoning, an exhaust gas temperature higher than a certain level is employed. More specifically, the exhaust gas temperature is preferably higher than 550° C. For example, in case that the NOx reduction catalyst is disposed on an upstream side of the exhaust gas passageway of the engine, high exhaust gas temperature can be always employed. At this time, it is preferable to provide a durability under heat to the NOx reduction catalyst in order to maintain the specific surface area (for example, higher than 50 m$^2$/g). The durability under heat can be effectively provided by combining CeO$_2$ and Zr to form a double oxide.

A double (compound) carbonate containing Ba and Mg may be used as the NOx adsorbing material. In this case, the sulfur-poisoning can be further easily released. It is unnecessary that whole Ba and Mg form the double carbonate, so that the effect of releasing the sulfur-poisoning is assumed to be exhibited if at least a part of Ba and/or Mg form the double carbonate. More specifically, it is preferable that Ba and Mg to be used as the NOx adsorbing material form a carbonate represented by the following formula:

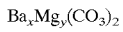

$$Ba_xMg_y(CO_3)_2$$

where x and y are atom ratios in which x=0.5 to 1.999; y=0.001 to 1.5; and x+y=2.0. The double carbonate containing Ba and Mg can effectively contribute to reduction of NOx in a temperature range where the double carbonate is active, while improving the performance of releasing the sulfur-poisoning.

Figure 3:
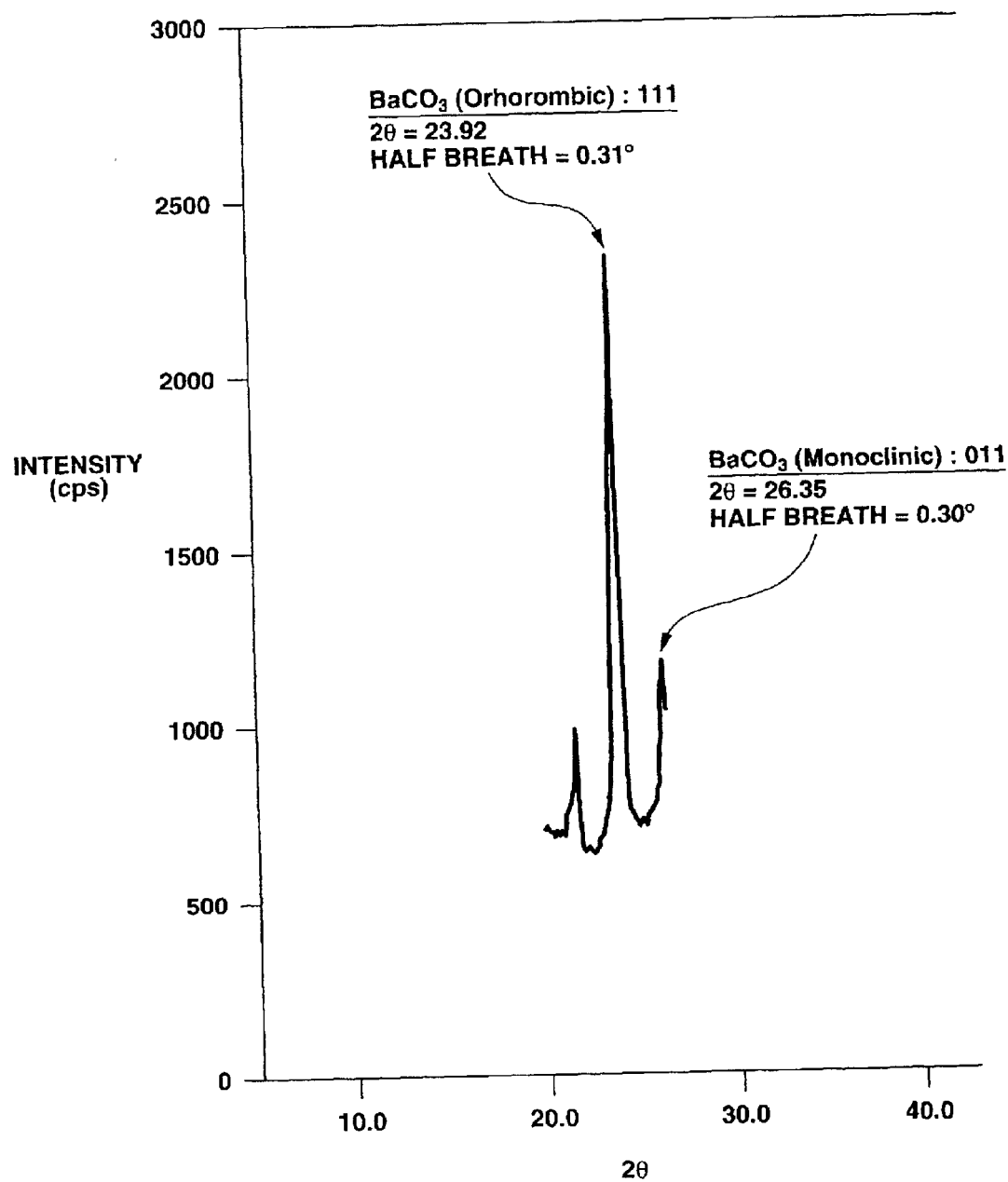
FIG. 3 is a graph of a X-ray diffraction (XRD) showing a peaks of barium carbonates.

Although single BaMg(CO$_3$)$_2$ can be detected by XRD (X-ray diffraction), the peak of BaMg(CO$_3$)$_2$ disappears when BaMg(CO$_3$)$_2$ is contained in the catalyst, in which the monoclinic peak of BaCO$_3$ appears in place of BaMg(CO$_3$)$_2$, as shown in FIG. 3. Usually, only BaCO$_3$ of orthorhombic crystal system appears, and therefore it is assumed that judgment as to whether BaMg(CO$_3$)$_2$ forms a double carbonate or not can be made.

The above-mentioned Ba as the NOx adsorbing material is included in the NOx reduction catalyst, preferably in an amount ranging from 5 to 30 g (in the form of BaO or calculated as oxide) per one liter of the substrate or per one liter of the NOx reduction catalyst per se. The above-mentioned Mg as the NOx adsorbing material is included in the NOx reduction catalyst, preferably in an amount ranging from 1 to 10 g (in the form of MgO or calculated as oxide) per one liter of the substrate or per one liter of the NOx reduction catalyst per se. The above-mentioned Na as the NOx adsorbing material is included in the NOx reduction catalyst, preferably in an amount ranging from 0.5 to 20.0 g per one liter of the substrate or per one liter of the NOx reduction catalyst per se. The above-mentioned Cs as the NOx adsorbing material is included in the NOx reduction catalyst, preferably in an amount ranging from 5 to 30 g (in the form of Cs$_2$O or calculated as oxide) per one liter of the substrate or per one liter of the NOx catalyst per se. The above-mentioned K is contained in the NOx reduction catalyst, preferably in an amount ranging from 0.5 to 30 g (in the form of K$_2$O or calculated as oxide) per one liter of the substrate or per one liter of the NOx reduction catalyst per se. If the contents of the above NOx adsorbing materials are smaller than the above-mentioned ranges, the ability of adsorbing NOx tends to become insufficient. Even if the contents of the above NOx adsorbing materials exceed the above ranges, the NOx adsorbing ability is saturated while excessive alkali metal and alkaline earth metal may not only promote the sulfur-poisoning but also degrade the durability (under heat) of the noble metal (such as Pt and Rh).

Figure 6:
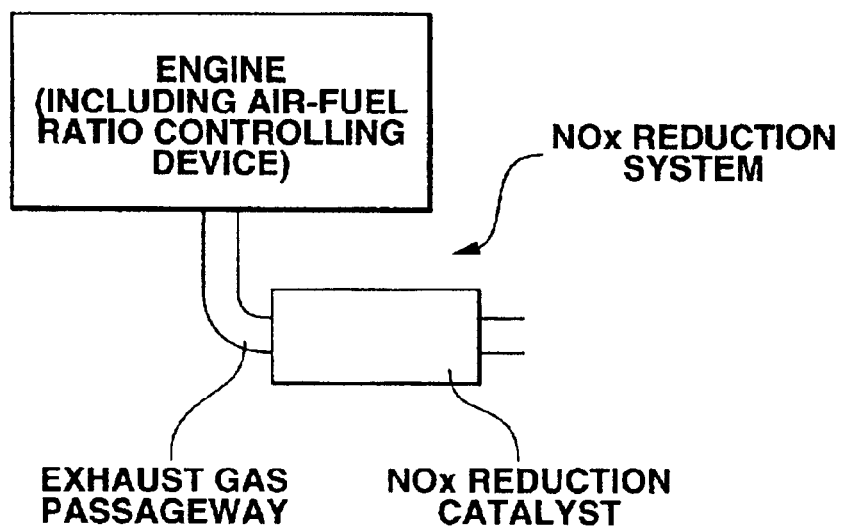
FIG. 6 is a schematic illustration of an example of a NOx reduction system according to the present invention.

According to the present invention, as shown in FIG. 6, a NOx reduction system is arranged for exhaust gas discharged from the combustion device (i.e., internal combustion engine or combustor) operable in the lean region and in the range including the stoichiometric region and the rich region. The NOx reduction system comprises the NOx reduction catalyst including the catalytic noble metal, and the oxygen adsorbable and releasable material which carries at least a part of the catalytic noble metal, wherein the catalytic noble metal carried on the oxygen adsorbable and releasable material adsorbs SOx in the exhaust gas, in the form of at least one of sulfate and sulfite. Additionally, a device is provided for controlling an air-fuel (air/fuel) ratio of an air-fuel mixture to be supplied to the combustion device, within a range of not smaller than 15 in the lean region. The device may be a fuel injector provided to the engine to inject metered fuel into a combustion chamber of the engine.

When the internal combustion engine or the combustor provided with the NOx reduction catalyst according to the present invention is operated in the lean region, it is preferable that an air-fuel (air/fuel) ratio of an air-fuel mixture to be supplied to the engine or the combustor is not smaller than 15.0, in which oxygen can be readily adsorbed to the oxygen adsorbable and releasable material (mainly $CeO_2$).

Figure 7:
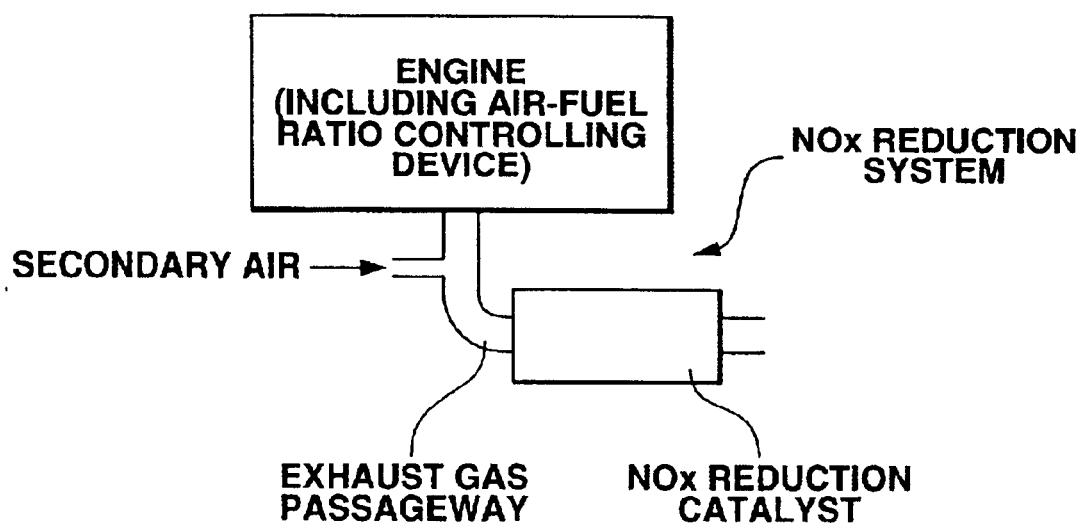
FIG. 7 is a schematic illustration of another example of a NOx reduction system according to the present invention.

According to the present invention, as shown in FIG. 7, another NOx reduction system is arranged for exhaust gas discharged from the combustion device (i.e., the engine or the like) operable in the lean region and in the range including the stoichiometric region and the rich region. The NOx reduction system comprises an exhaust gas passageway through which exhaust gas from the combustion device flows. The NOx reduction catalyst is disposed in the exhaust gas passageway and includes the catalytic noble metal, and the oxygen adsorbable and releasable material which carries at least a part of the catalytic noble metal, wherein the catalytic noble metal carried on the oxygen adsorbable and releasable material adsorbs SOx in the exhaust gas, in the form of at least one of sulfate and sulfite. A device is provided for causing secondary air to flow into the exhaust gas passageway upstream of the NOx reduction catalyst in the range including the stoichiometric region and the rich region.

When the engine or the like is operated in the range including the stoichiometric region and the rich region, it is preferable to increase the rate of oxygen in exhaust gas to be flown to the NOx reduction catalyst by supplying so-called secondary air to exhaust gas. This further increases the concentration of oxygen in exhaust gas in addition to release of oxygen from the oxygen adsorbable and releasable material, thereby making it possible to further facilitate releasing the sulfur-poisoning. Further, when the air-fuel ratio of the air-fuel mixture to be supplied to the engine or the like is within a range of from 15 to 50 (or in the lean region) and within a range of from 10.0 to 14.6 (or in the rich region), NOx can be effectively reduced to purify exhaust gas from the engine or the like.

It will be understood that Ba, Mg, Na, Cs and K usable as the NOx adsorbing material are not-limited to carbonate and therefore may be used in the form of oxide, hydroxide and/or the like.

The NOx reduction catalyst of the present invention is used in a variety of shapes. For example, the catalyst components of the NOx reduction catalyst are carried on a honeycomb-type monolithic substrate or the like formed of cordierite, stainless steel or the like, in which powder (pulverized material) of the catalyst components in the catalytic layer is coated in the form of slurry on the surface of each wall defining a cell serving as a gas passage through which exhaust gas flows. The catalyst components may be carried on the wall of the monolithic substrate, in a manner to form a plurality of catalytic coat layers on the wall of the monolithic substrate.

EXAMPLES

The present invention will be more readily understood with reference to the following Examples in comparison with Comparative Examples; however, these Examples are intended to illustrate the invention and are not to be construed to limit the scope of the invention.

Example 1

First, activated alumina having a specific surface area of 180 $m^2$ was impregnated with a solution of dinitrodiammine platinum (Pt) and then calcined in air at 400° C. for 1 hour after drying thereby obtaining Powder A which had a Pt concentration of 1.5% by weight.

Then, activated ceria having a specific surface area of 60 $m^2$ was impregnated with a solution of dinitrodiammine platinum (Pt) and then calcined in air at 400° C. for 1 hour after drying thereby obtaining Powder B which had a Pt concentration of 1.5% by weight.

Subsequently, a porcelain ball mill was charged with 463.7 g of Powder A, 100.8 g of Powder B, 127.4 g of activated alumina, 28.8 g of alumina sol, and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer having a weight of 200 g per one liter of the monolithic substrate.

Figure 4:
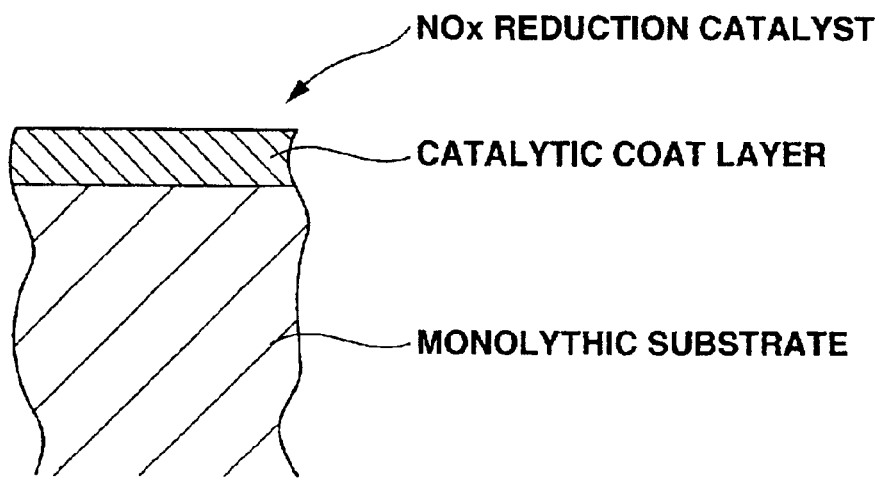
FIG. 4 is a fragmentary sectional view of an example of a NOx reduction catalyst according to the present invention.

The thus produced catalyst was dipped in an aqueous solution containing barium acetate and magnesium acetate, thereby impregnating the catalytic coat layer with barium and magnesium. As a result, a NOx reduction catalyst of this Example was produced as shown in FIG. 4. As shown in Table 1, this NOx reduction catalyst contained Pt, Ba and Mg respectively in amounts of 2.35 g, 20 g (calculated as oxide) and 5 g (calculated as oxide) per one liter of the monolithic substrate. Additionally, this NOx reduction catalyst contained $CeO_2$ in an amount of 28 g per one liter of the monolithic substrate, in which Pt carried on $CeO_2$ was 18% by weight of the whole Pt contained in the NOx reduction catalyst.

Example 2

First, activated alumina having a specific surface area of 180 $m^2$ was impregnated with a solution of Rh nitrate and then calcined in air at 400° C. for 1 hour after drying thereby obtaining Powder C which had a Rh concentration of 1% by weight.

Subsequently, a porcelain ball mill was charged with 370.7 g of Powder A, 80.6 g of Powder B, 135.9 g of Powder C, 109.7 g of activated alumina, 23 g of alumina sol, and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer having a weight of 250 g per one liter of the monolithic substrate.

The thus produced catalyst was dipped in an aqueous solution containing barium acetate and magnesium acetate, thereby impregnating the catalytic coat layer with barium and magnesium. As a result, a NOx reduction catalyst of this Example was produced. As shown in Table 1, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28 g per one liter of the monolithic substrate, in which Pt carried on $CeO_2$ was 18% by weight of the whole Pt contained in the NOx reduction catalyst.

Example 3

First, activated alumina having a specific surface area of 180 m$^2$ was impregnated with a solution of dinitrodiammine platinum (Pt) and then calcined in air at 400° C. for 1 hour after drying thereby obtaining Powder D which had a Pt concentration of 0.6% by weight.

Subsequently, a porcelain ball mill was charged with 579.6 g of Powder D, 51.1 g of Powder B, 57.6 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 308.9 g of Powder A, 67.7 g of Powder B, 226.8 g of Powder C, 92.9 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

Figure 5:
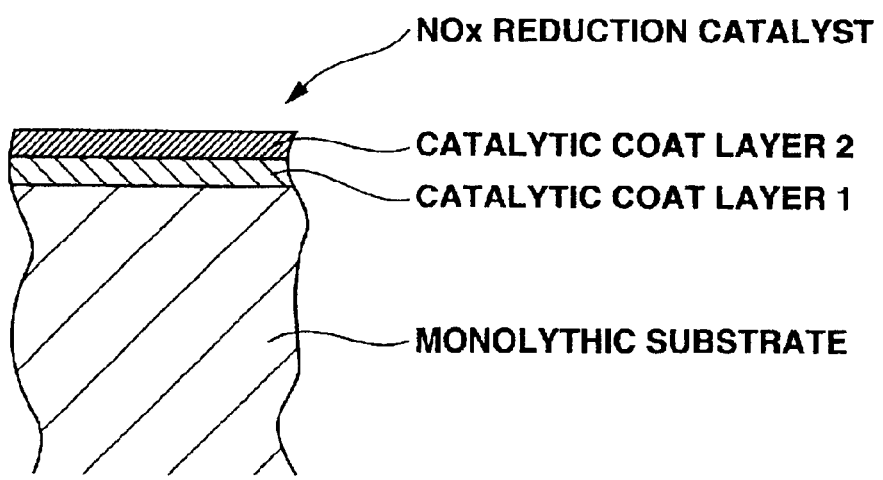
FIG. 5 is a fragmentary sectional view of another example of the NOx reduction catalyst according to the present invention.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced as shown in FIG. 5. As shown in Table 1, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 4

First, a porcelain ball mill was charged with 579.6 g of Powder D, 97.9 g of Powder B, 10.1 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Subsequently, a porcelain ball mill was charged with 308.9 g of Powder A, 7.2 g of Powder B, 226.8 g of Powder C, 153.3 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 1, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 0.97:0.03.

Example 5

A procedure of Example 3 was repeated with the following exceptions: After the catalytic coat layer 2 had been formed on the catalytic coat layer 1 to produce the catalyst formed with two (inner and outer) catalytic coat layers, the produced catalyst formed with two (inner and outer) catalytic coat layers was dipped in an aqueous solution containing barium acetate, magnesium acetate and sodium acetate, thereby impregnating the catalytic coat layers with barium, magnesium and sodium. As a result, a NOx reduction catalyst of this Example was produced. As shown in Table 1, this NOx reduction catalyst contained Pt, Rh, Ba, Mg and Na respectively in amounts of 2.35 g, 0.47 g, 20 g (calculated as oxide), 5 g (calculated as oxide) and 10 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 6

A procedure of Example 3 was repeated with the following exceptions: After the catalytic coat layer 2 had been formed on the catalytic coat layer 1 to produce the catalyst formed with two (inner and outer) catalytic coat layers, the produced catalyst formed with two (inner and outer) catalytic coat layers was dipped in an aqueous solution containing barium acetate, magnesium acetate and cesium acetate, thereby impregnating the catalytic coat layers with barium, magnesium and cesium. As a result, a NOx reduction catalyst of this Example was produced. As shown in Table 1, this NOx reduction catalyst contained Pt, Rh, Ba, Mg and Cs respectively in amounts of 2.35 g, 0.47 g, 10 g (calculated as oxide), 5 g (calculated as oxide) and 20 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 7

A procedure of Example 3 was repeated with the following exception: After the catalytic coat layer 2 had been formed on the catalytic coat layer 1 to produce the catalyst formed with two (inner and outer) catalytic coat layers, the produced catalyst formed with the two (inner and outer) catalytic coat layers was dipped in an aqueous solution containing barium acetate, magnesium acetate, sodium acetate and potassium acetate, thereby impregnating the catalytic coat layers with barium, magnesium, sodium and potassium. As a result, a NOx reduction catalyst of this Example was produced. As shown in Table 1, this NOx reduction catalyst contained Pt, Rh, Ba, Mg and K respectively in amounts of 2.35 g, 0.47 g, 20 g (calculated as oxide), 5 g (calculated as oxide) and 20 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 8

A procedure of Example 3 was repeated with the following exceptions: After the catalytic coat layer 2 had been formed on the catalytic coat layer 1 to produce the catalyst formed with two (inner and outer) catalytic coat layers, the produced catalyst formed with two (inner and outer) catalytic coat layers was dipped in an aqueous solution containing barium acetate, magnesium acetate, sodium acetate and cesium acetate, thereby impregnating the catalytic coat layers with barium, magnesium, sodium and cesium. As a result, a NOx reduction catalyst of this Example was produced. As shown in Table 1, this NOx reduction catalyst contained Pt, Rh, Ba, Mg, Na and Cs respectively in amounts of 2.35 g, 0.47 g, 10 g (calculated as oxide), 5 g (calculated as oxide), 5 g (calculated as oxide) and 20 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 9

A procedure of Example 3 was repeated with the following exceptions: After the catalytic coat layer 2 had been formed on the catalytic coat layer 1 to produce the catalyst formed with two (inner and outer) catalytic coat layers, the produced catalyst formed with the two (inner and outer) catalytic coat layers was dipped in an aqueous solution containing barium acetate, magnesium acetate, sodium acetate and potassium acetate, thereby impregnating the catalytic coat layers with barium, magnesium, sodium and potassium. As a result, a NOx reduction catalyst of this Example was produced. As shown in Table 1, this NOx reduction catalyst contained Pt, Rh, Ba, Mg, Na and K respectively in amounts of 2.35 g, 0.47 g, 20 g (calculated as oxide), 5 g (calculated as oxide), 5 g (calculated as oxide) and 20 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 10

A procedure of Example 3 was repeated with the following exceptions: After the catalytic coat layer 2 had been formed on the catalytic coat layer 1 to produce the catalyst formed with two (inner and outer) catalytic coat layers, the produced catalyst formed with the two (inner and outer) catalytic coat layers was dipped in an aqueous solution containing barium acetate, magnesium acetate, cesium acetate and potassium acetate, thereby impregnating the catalytic coat layers with barium, magnesium, cesium and potassium. As a result, a NOx reduction catalyst of this Example was produced. As shown in Table 1, this NOx reduction catalyst contained Pt, Rh, Ba, Mg, Cs and K respectively in amounts of 2.35 g, 0.47 g, 10 g (calculated as oxide), 5 g (calculated as oxide), 10 g (calculated as oxide) and 10 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 11

A procedure of Example 3 was repeated with the following exceptions: After the catalytic coat layer 2 had been formed on the catalytic coat layer 1 to produce the catalyst formed with two (inner and outer) catalytic coat layers, the produced catalyst formed with the two (inner and outer) catalytic coat layers was dipped in an aqueous solution containing barium acetate, magnesium acetate, sodium acetate, cesium acetate and potassium acetate, thereby impregnating the catalytic coat layers with barium, magnesium, cesium and potassium. As a result, a NOx reduction catalyst of this Example was produced. As shown in Table 1, this NOx reduction catalyst contained Pt, Rh, Ba, Mg, Na, Cs and K respectively in amounts of 2.35 g, 0.47 g, 10 g (calculated as oxide), 5 g (calculated as oxide), 5 g (calculated as oxide), 10 g (calculated as oxide) and 10 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Example 12

A procedure of Example 3 was repeated with the exception that activated ceria for Powder B of Example 3 was replaced with a Ce—Zr double oxide which was prepared by combining 25% by weight of $ZrO_2$, thereby producing a NOx reduction catalyst of this Example. A composition of this NOx reduction catalyst is shown in Table 1.

Example 13

A procedure of Example 4 was repeated with the exception that activated ceria for Powder B of Example 4 was replaced with a Ce—Zr double oxide which was prepared by combining 25% by weight of $ZrO_2$, thereby producing a NOx reduction catalyst of this Example. A composition of this NOx reduction catalyst is shown in Table 1.

Example 14

A procedure of Example 5 was repeated with the exception that activated ceria for Powder B of Example 5 was replaced with a Ce—Zr double oxide which was prepared by combining 25% by weight of $ZrO_2$, thereby producing a NOx reduction catalyst of this Example. A composition of this NOx reduction catalyst is shown in Table 1.

Example 15

A procedure of Example 6 was repeated with the exception that activated ceria for Powder B of Example 6 was replaced with a Ce—Zr double oxide which was prepared by combining 25% by weight of ZrO2, thereby producing a NOx reduction catalyst of this Example. A composition of this NOx reduction catalyst is shown in Table 1.

Example 16

A procedure of Example 7 was repeated with the exception that activated ceria for Powder B of Example 7 was replaced with a Ce—Zr double oxide which was prepared by combining 25% by weight of ZrO2, thereby producing a NOx reduction catalyst of this Example. A composition of this NOx reduction catalyst is shown in Table 1.

Example 17

A procedure of Example 8 was repeated with the exception that activated ceria for Powder B of Example 8 was replaced with a Ce—Zr double oxide which was prepared by combining 25% by weight of $ZrO_2$, thereby producing a NOx reduction catalyst of this Example. A composition of this NOx reduction catalyst is shown in FIG. 1.

Example 18

A procedure of Example 9 was repeated with the exception that activated ceria for Powder B of Example 9 was replaced with a Ce—Zr double oxide which was prepared by combining 25% by weight of $ZrO_2$, thereby producing a NOx reduction catalyst of this Example. A composition of this NOx reduction catalyst is shown in Table 1.

Example 19

A procedure of Example 10 was repeated with the exception that activated ceria for Powder B of Example 10 was replaced with a Ce—Zr double oxide which was prepared by combining 25% by weight of $ZrO_2$, thereby producing a NOx reduction catalyst of this Example. A composition of this NOx reduction catalyst is shown in Table 1.

Example 20

A procedure of Example 11 was repeated with the exception that activated ceria for Powder B of Example 11 was replaced with a Ce—Zr double oxide which was prepared by combining 25% by weight of $ZrO_2$, thereby producing a NOx reduction catalyst of this Example. A composition of this NOx reduction catalyst is shown in Table 1.

Comparative Example 1

First, activated alumina having a specific surface area of 180 $m^2$ was impregnated with a solution of palladium nitrate and then calcined in air at 400° C. for 1 hour after drying thereby obtaining Powder E which had a Pd concentration of 1.5% by weight.

Activated alumina having a specific surface area of 180 $m^2$ was impregnated with a solution of palladium nitrate and then calcined in air at 400° C. for 1 hour after drying thereby obtaining Powder E which had a Pd concentration of 0.6% by weight.

Activated ceria having a specific surface area of 60 $m^2$ was impregnated with a solution of palladium nitrate and then calcined in air at 400° C. for 1 hour after drying thereby obtaining Powder G which had a Pd concentration of 1.5% by weight.

Subsequently, a porcelain ball mill was charged with 579.6 g of Powder F, 51.1 g of Powder G, 57.6 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 308.9 g of Powder E, 67.7 g of Powder G, 226.8 g of Powder C, 92.9 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pd, Rh, Ba and Mg respectively in amounts of 2.35 g, 0.47 g, 20 g (calculated as oxide) and 5 g (calculated as oxide) per one liter of the monolithic substrate. Additionally, Pd and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pd carried on $CeO_2$ was 18% by weight of the whole Pd contained in the NOx reduction catalyst, and $CeO_2$ contained in the catalytic coat layer 1 and $CeO_2$ contained in the catalytic coat layer 2 were in a weight ratio of 1:1.

Comparative Example 2

First, activated alumina having a specific surface area of 180 m² was impregnated with a solution of dinitrodiammine platinum and then calcined in air at 400° C. for 1 hour after drying thereby obtaining Powder H which had a Pt concentration of 1.75% by weight.

Activated alumina having a specific surface area of 180 m² was impregnated with a solution of dinitrodiammine platinum and then calcined in air at 400° C. for 1 hour after drying thereby obtaining Powder I which had a Pt concentration of 0.7% by weight.

Activated ceria having a specific surface area of 60 m² was impregnated with a solution of dinitrodiammine platinum and then calcined in air at 400° C. for 1 hour after drying thereby obtaining Powder J which had a Pt concentration of 0.33% by weight.

Subsequently, a porcelain ball mill was charged with 579.6 g of Powder I, 51.1 g of Powder J, 57.6 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 308.9 g of Powder H, 67.7 g of Powder J, 226.8 g of Powder C, 92.9 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 4% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Comparative Example 3

First, activated alumina having a specific surface area of 180 m² was impregnated with a solution of dinitrodiammine platinum and then calcined in air at 400° C. for 1 hour after drying thereby obtaining Powder K which had a Pt concentration of 0.89% by weight.

Activated alumina having a specific surface area of 180 m² was impregnated with a solution of dinitrodiammine platinum and then calcined in air at 400° C. for 1 hour after drying thereby obtaining Powder L which had a Pt concentration of 0.36% by weight.

Activated ceria having a specific surface area of 60 m² was impregnated with a solution of dinitrodiammine platinum and then calcined in air at 400° C. for 1 hour after drying thereby obtaining Powder M which had a Pt concentration of 4.3% by weight.

Subsequently, a porcelain ball mill was charged with 579.6 g of Powder L, 51.1 g of Powder M, 57.6 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 308.9 g of Powder K, 67.7 g of Powder M, 226.8 g of Powder C, 92.9 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on $CeO_2$ was 51% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Comparative Example 4

First, activated ceria having a specific surface area of 60 $m^2$ was impregnated with a solution of dinitrodiammine platinum and then calcined in air at 400° C. for 1 hour after drying thereby obtaining Powder N which had a Pt concentration of 11.8% by weight.

Subsequently, a porcelain ball mill was charged with 634.7 g of Powder D, 3.6 g of Powder N, 49.7 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 338.4 g of Powder A, 4.8 g of Powder N, 226.8 g of Powder C, 150.2 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 2 g per one liter of the monolithic substrate, in which Pt carried on $CeO_2$ was 10% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Comparative Example 5

First, activated alumina having a specific surface area of 180 $m^2$ was impregnated with a solution of dinitrodiammine platinum and then calcined in air at 400° C. for 1 hour after drying thereby obtaining Powder O which had a Pt concentration of 2.0% by weight.

Activated ceria having a specific surface area of 60 $m^2$ was impregnated with a solution of dinitrodiammine platinum and then calcined in air at 400° C. for 1 hour after drying thereby obtaining Powder P which had a Pt concentration of 0.47% by weight.

Subsequently, a porcelain ball mill was charged with 483.5 g of Powder I, 181.8 g of Powder P, 22.7 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 225.6 g of Powder O, 242.4 g of Powder P, 226.8 g of Powder C, 1.4 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 101 g per one liter of the monolithic substrate, in which Pt carried on $CeO_2$ was 20% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Comparative Example 6

First, activated alumina having a specific surface area of 180 $m^2$ was impregnated with a solution of dinitrodiammine platinum and then calcined in air at 400° C. for 1 hour after drying thereby obtaining Powder Q which had a Pt concentration of 0.69% by weight.

Activated alumina having a specific surface area of 180 $m^2$ was impregnated with a solution of dinitrodiammine platinum and then calcined in air at 400° C. for 1 hour after drying thereby obtaining Powder R which had a Pt concentration of 0.27% by weight.

Activated ceria having a specific surface area of 60 $m^2$ was impregnated with a solution of dinitrodiammine platinum and then calcined in air at 400° C. for 1 hour after drying thereby obtaining Powder S which had a Pt concentration of 0.69% by weight.

Activated alumina having a specific surface area of 180 $m^2$ was impregnated with a solution of Rh nitrate and then calcined in air at 400° C. for 1 hour after drying thereby obtaining Powder T which had a Rh concentration of 0.47% by weight.

Subsequently, a porcelain ball mill was charged with 579.6 g of Powder R, 51.1 g of Powder S, 57.6 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Thereafter, a porcelain ball mill was charged with 308.9 g of Powder Q, 67.7 g of Powder S, 226.8 g of Powder T, 92.9 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pt, Rh, Ba and Mg respectively in amounts of 1.08 g, 0.22 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 1.3 g per one liter of the monolithic substrate. The NOx reduction catalyst contained $CeO_2$ in an amount of 28.2 g per one liter of the monolithic substrate, in which Pt carried on $CeO_2$ was 18% by weight of the whole Pt contained in the NOx reduction catalyst, and $CeO_2$ contained in the catalytic coat layer 1 and $CeO_2$ contained in the catalytic coat layer 2 were in a weight ratio of 1:1.

Comparative Example 7

First, a porcelain ball mill was charged with 579.6 g of Powder D, 43.9 g of Powder B, 64.1 g of activated alumina, 32.4 g of alumina sol and 1080 g of water, upon which mixing and grinding were made in the ball mill, thereby obtaining a slurry. This slurry was coated on a honeycomb-type cordierite ceramic monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined at 400° C. for 1 hour thereby producing a catalyst formed with a catalytic coat layer 1 having a weight of 200 g per one liter of the monolithic substrate.

Subsequently, a porcelain ball mill was charged with 308.9 g of Powder A, 76.8 g of Powder B, 83.7 g of Powder C, 153.3 g of activated alumina, 23.8 g of alumina sol and 1080 g of water, upon which mixing and grinding were made in the ball mill, thereby obtaining a slurry. This slurry was applied on the catalyst in such a manner as to be coated on the catalytic coat layer 1. The thus coated catalyst was blown with air to remove excessive slurry in the cells under the action of air stream. Thereafter, the coated catalyst was dried at 130° C. and then calcined at 400° C. for 1 hour thereby forming a catalytic coat layer 2 on the catalytic coat layer 1. The catalytic coat layer 2 had a weight of 150 g per one liter of the monolithic substrate.

The thus produced catalyst formed with two (inner and outer) catalytic coat layers was dipped in an aqueous solution containing barium acetate and magnesium acetate, thereby impregnating the catalytic coat layers with barium and magnesium. As a result, a NOx reduction catalyst of this Example was produced. As shown in Table 2, this NOx reduction catalyst contained Pt, Rh, Ba and Mg respectively in amounts of 2.35 g, 0.47 g, 20 g (calculated as oxide) and 5 g (calculated as oxide) per one liter of the monolithic substrate. Additionally, Pt and Rh contained in this NOx reduction catalyst had a weight ratio (Pt/Rh) of 5/1, in which the total weight of them was 2.82 g per one liter of the monolithic substrate. The NOx reduction catalyst contained $CeO_2$ in an amount of 28.2 g per one liter of the monolithic substrate, in which Pt carried on CeO$_2$ was 18% by weight of the whole Pt contained in the NOx reduction catalyst, and CeO$_2$ contained in the catalytic coat layer 1 and CeO$_2$ contained in the catalytic coat layer 2 were in a weight ratio of 1:13.

Comparative Example 8

A procedure of Example 3 was repeated with the exception that the two catalytic coat layers of the produced catalyst were impregnated with barium and magnesium so as to contain Ba and Mg which were respectively in amounts of 4 g (calculated as oxide) and 0.9 g (calculated as oxide) per one liter of the monolithic substrate, thereby producing a NOx reduction catalyst of this Example. A composition of this NOx reduction catalyst is shown in Table 2.

Comparative Example 9

A procedure of Example 3 was repeated with the exception that the two catalytic coat layers of the produced catalyst were impregnated with barium and magnesium so as to contain Ba and Mg which were respectively in amounts of 31 g (calculated as oxide) and 11 g (calculated as oxide) per one liter of the monolithic substrate, thereby producing a NOx reduction catalyst of this Example. A composition of this NOx reduction catalyst is shown in Table 2.

Comparative Example 10

A procedure of Example 5 was repeated with the exception that the two catalytic coat layers of the produced catalyst were impregnated with barium, magnesium and sodium so as to contain Ba, Mg and Na which were respectively in amounts of 4 g (calculated as oxide), 0.9 g (calculated as oxide) and 0.4 g (calculated as oxide) per one liter of the monolithic substrate, thereby producing a NOx reduction catalyst of this Example. A composition of this NOx reduction catalyst is shown in Table 2.

Comparative Example 11

A procedure of Example 5 was repeated with the exception that the two catalytic coat layers of the produced catalyst were impregnated with barium, magnesium and sodium so as to contain Ba, Mg and Na which were respectively in amounts of 31 g (calculated as oxide), 11 g (calculated as oxide) and 21 g (calculated as oxide) per one liter of the monolithic substrate, thereby producing a NOx reduction catalyst of this Example. A composition of this NOx reduction catalyst is shown in Table 2.

Comparative Example 12

A procedure of Example 6 was repeated with the exception that the two catalytic coat layers of the produced catalyst were impregnated with barium, magnesium and cesium so as to contain Ba, Mg and Cs which were respectively in amounts of 4 g (calculated as oxide), 0.9 g (calculated as oxide) and 4 g (calculated as oxide) per one liter of the monolithic substrate, thereby producing a NOx reduction catalyst of this Example. A composition of this NOx reduction catalyst is shown in Table 2.

Comparative Example 13

A procedure of Example 6 was repeated with the exception that the two catalytic coat layers of the produced catalyst were impregnated with barium, magnesium and cesium so as to contain Ba, Mg and Cs which were respectively in amounts of 31 g (calculated as oxide), 11 g (calculated as oxide) and 31 g (calculated as oxide) per one liter of the monolithic substrate, thereby producing a NOx reduction catalyst of this Example. A composition of this NOx reduction catalyst is shown in Table 2.

Comparative Example 14

A procedure of Example 7 was repeated with the exception that the two catalytic coat layers of the produced catalyst were impregnated with barium, magnesium and potassium so as to contain Ba, Mg and K which were respectively in amounts of 4 g (calculated as oxide), 0.9 g (calculated as oxide) and 0.4 g (calculated as oxide) per one liter of the monolithic substrate, thereby producing a NOx reduction catalyst of this Example. A composition of this NOx reduction catalyst is shown in Table 2.

Comparative Example 15

A procedure of Example 7 was repeated with the exception that the two catalytic coat layers of the produced catalyst were impregnated with barium, magnesium and potassium so as to contain Ba, Mg and K which were respectively in amounts of 31 g (calculated as oxide), 11 g (calculated as oxide) and 31 g (calculated as oxide) per one liter of the monolithic substrate, thereby producing a NOx reduction catalyst of this Example. A composition of this NOx reduction catalyst is shown in Table 2.

Comparative Example 16

A procedure of Example 8 was repeated with the exception that the two catalytic coat layers of the produced catalyst were impregnated with barium, magnesium, sodium and cesium so as to contain Ba, Mg, Na and Cs which were respectively in amounts of 4 g (calculated as oxide), 0.9 g (calculated as oxide), 0.4 g (calculated as oxide) and 4 g (calculated as oxide) per one liter of the monolithic substrate, thereby producing a NOx reduction catalyst of this Example. A composition of this NOx reduction catalyst is shown in Table 2.

Comparative Example 17

A procedure of Example 8 was repeated with the exception that the two catalytic coat layers of the produced catalyst were impregnated with barium, magnesium and cesium so as to contain Ba, Mg, Na and Cs which were respectively in amounts of 31 g (calculated as oxide), 11 g (calculated as oxide), 21 g (calculated as oxide) and 31 g (calculated as oxide) per one liter of the monolithic substrate, thereby producing a NOx reduction catalyst of this Example. A composition of this NOx reduction catalyst is shown in Table 2.

Comparative Example 18

A procedure of Example 9 was repeated with the exception that the two catalytic coat layers of the produced catalyst were impregnated with barium, magnesium, sodium and potassium so as to contain Ba, Mg, Na and K which were respectively in amounts of 4 g (calculated as oxide), 0.9 g (calculated as oxide), 0.4 g (calculated as oxide) and 0.4 g (calculated as oxide) per one liter of the monolithic substrate, thereby producing a NOx reduction catalyst of this Example. A composition of this NOx reduction catalyst is shown in Table 2.

Comparative Example 19

A procedure of Example 9 was repeated with the exception that the two catalytic coat layers of the produced catalyst were impregnated with barium, magnesium, sodium and potassium so as to contain Ba, Mg, Na and K which were respectively in amounts of 31 g (calculated as oxide), 11 g (calculated as oxide), 21 g (calculated as oxide) and 31 g (calculated as oxide) per one liter of the monolithic substrate, thereby producing a NOx reduction catalyst of this Example. A composition of this NOx reduction catalyst is shown in Table 2.

Comparative Example 20

A procedure of Example 10 was repeated with the exception that the two catalytic coat layers of the produced catalyst were impregnated with barium, magnesium, cesium and potassium so as to contain Ba, Mg, Cs and K which were respectively in amounts of 4 g (calculated as oxide), 0.9 g (calculated as oxide), 4 g (calculated as oxide) and 0.4 g (calculated as oxide) per one liter of the monolithic substrate, thereby producing a NOx reduction catalyst of this Example. A composition of this NOx reduction catalyst is shown in Table 2.

Comparative Example 21

A procedure of Example 10 was repeated with the exception that the two catalytic coat layers of the produced catalyst were impregnated with barium, magnesium, cesium and potassium so as to contain Ba, Mg, Cs and K which were respectively in amounts of 31 g (calculated as oxide), 11 g (calculated as oxide), 31 g (calculated as oxide) and 31 g (calculated as oxide) per one liter of the monolithic substrate, thereby producing a NOx reduction catalyst of this Example. A composition of this NOx reduction catalyst is shown in Table 2.

Comparative Example 22

A procedure of Example 11 was repeated with the exception that the two catalytic coat layers of the produced catalyst were impregnated with barium, magnesium, cesium and potassium so as to contain Ba, Mg, Na, Cs and K which were respectively in amounts of 4 g (calculated as oxide), 0.9 g (calculated as oxide), 0.4 g (calculated as oxide), 4 g (calculated as oxide) and 0.4 g (calculated as oxide) per one liter of the monolithic substrate, thereby producing a NOx reduction catalyst of this Example. A composition of this NOx reduction catalyst is shown in Table 2.

Comparative Example 23

A procedure of Example 11 was repeated with the exception that the two catalytic coat layers of the produced catalyst were impregnated with barium, magnesium, cesium and potassium so as to contain Ba, Mg, Na, Cs and K which were respectively in amounts of 31 g (calculated as oxide), 11 g (calculated as oxide), 21 g (calculated as oxide), 31 g (calculated as oxide) and 31 g (calculated as oxide) per one liter of the monolithic substrate, thereby producing a NOx reduction catalyst of this Example. A composition of this NOx reduction catalyst is shown in Table 2.

Evaluation of Performance for Exhaust Gas Purifying Catalyst of Examples 1 to 20 and Comparative Examples 1 to 23

Evaluation test (for emission performance) was conducted on the NOx reduction catalysts of Examples and Comparative Examples, using a gasoline-fueled internal combustion engine having a displacement of 2000 cc, provided with an exhaust system including an exhaust pipe. For the evaluation test, each NOx reduction catalyst was disposed inside a casing to constitute a catalytic converter. The catalytic converter was disposed in the exhaust pipe of the exhaust system of the engine.

Prior to the evaluation test, each of the catalysts of Examples and Comparative Examples underwent a durability test in which each catalyst was disposed as the catalytic converter in an exhaust pipe of an exhaust system of a gasoline-fueled internal combustion having a displacement of 4400 cc. The durability test was conducted as follows: The engine was operated for 50 hours using a regular gasoline (in Japan) as fuel while keeping a temperature at a converter inlet position immediately upstream of the catalyst at 700° C. After the durability test, each of the catalysts of Examples and Comparative Examples was disposed as the catalytic converter in an exhaust pipe of an exhaust system of a gasoline-fueled internal combustion engine having a displacement of 2000 cc.

After completion of the durability test, the engine was operated for 10 hours using a gasoline (having a S concentration of 300 ppm) as fuel while keeping the temperature at the converter inlet position at 350° C., thereby applying a so-called sulfur-poisoning treatment on the catalyst. Subsequently, the engine was operated at an air-fuel ratio (air/fuel) of 14.2 for 5 minutes using the regular gasoline while keeping the temperature6 at the converter inlet position at 650° C., thereby applying a so-called sulfur-releasing treatment on the catalyst.

The evaluation test was conducted as follows: At time points of completions of the respective durability test, the application of the sulfur-poisoning treatment and the application of sulfur-releasing treatment. each of the NOx reduction catalysts of Examples and Comparative Examples was subjected to a so-called 10–15 mode test in "Traffic safety and nuisance Research Institute's automobile type Approval test Standard (TRIAS)" set by the Japanese Ministry of Transport. The 10–15 mode test included a steady state vehicle running in which the engine was operated at a lean air-fuel ratio (air/fuel=25), a deceleration vehicle running in which fuel supply to the engine was cut, an acceleration vehicle running in which the engine was operated at an air-fuel ratio ranging from a rich air-fuel ratio (air/fuel=11.0) to a stoichiometric air-fuel ratio (air/fuel=14.6). During the 10–15 mode test, the temperature at the converter inlet position immediately upstream of the catalyst was kept at 300° C. During this 10–15 mode test, the concentration (volume or ppm) of NOx was measured respectively at positions of the exhaust pipe upstream and downstream of the NOx reduction catalyst. Such measurement was made on the catalyst in a first state obtained after completion of the durability test, a second state obtained after application of the sulfur-poisoning treatment and a third state obtained after application of the sulfur-releasing treatment. The conversion rate (%) was calculated by [(1−the concentration of NOx in the exhaust pipe downstream of the catalyst/the concentration of NOx in the exhaust pipe upstream of the catalyst)×100]. Thus, the convention rate (%) was determined for the catalyst in the first, second and second states. Additionally, a recovery rate (%) is calculated by [(the NOx conversion rate after the sulfur-releasing treatment/the NOx conversion rate after the durability test)×100]. This recovery rate represents the rate of recovery in NOx conversion rate, obtained after the sulfur-releasing treatment, relative to the NOx conversion rate after the durability test.

Results (conversion rates) of the above evaluation test were shown in Tables 3 and 4.

The test results of Example 3 and Comparative Example 1 depict that it is advantageous to contain Pt as a catalytic noble metal in the NOx reduction catalyst. Pd makes its sintering, so that it is difficult to release the sulfur-poisoning from it, thereby extremely degrading the recovery rate.

The test results of Example 3, Comparative Example 2 and Comparative Example 3 depict that the recovery rate is degraded in case that the rate of Pt carried on $CeO_2$ relative to the whole Pt contained in the NOx reduction catalyst is too small; whereas the recovery rate is good but the performance (NOx conversion rate) of the NOx reduction catalyst after the durability test is degraded in case that the same rate is too large. The same fact can be seen from the test results of Example 3, Comparative Example 4 and Comparative Example 5. Additionally, the recovery rate is degraded in case that the amount of $CeO_2$ contained in the NOx reduction catalyst is too small, whereas the recovery rate is good while the performance (NOx conversion rate) of the NOx reduction catalyst after the durability test is degraded in case that the amount of $CeO_2$ is too large.

Furthermore, the test results of Example 3, Example 4 and Comparative Example 7 depict that the NOx conversion rate is improved in case that the amount of $CeO_2$ contained in the inner catalytic coat layer is larger while the amount of $CeO_2$ contained in the outer catalytic coat layer is smaller.

The test results of Example 3 and Comparative Example 6 depict that all the performances of the NOx reduction catalyst are degraded in case that the amount of Pt and/or Pd carried in the NOx reduction catalyst is smaller.

The test results of Example 3 and Comparative Examples 8 to 23 depict that the performance (NOx conversion rate) of the NOx reduction catalyst after the durability test is good in case that the amount of the NOx adsorbing material contained in the NOx reduction catalyst is too large, whereas the NOx reduction catalyst is improved in recovery rate but deteriorated in performance after the durability test in case that the amount of NOx adsorbing material is too small.

While all the experiments or evaluation tests for Examples and Comparative Examples were conducted by using the gasoline-fueled engines, it will be understood that the same effects will be obtained by the same experiments conducted by using diesel engines.

As appreciated from the above, according to the present invention, the oxygen adsorbable and releasable material in the NOx reduction catalyst can release oxygen when oxygen is insufficient in exhaust gas. This oxygen prevents $SO_2$ and/or the like from their sulfidization, thereby facilitating releasing of the sulfur-poisoning from the catalyst.

The entire contents of Japanese Patent Application P2001-069384 (filed Mar. 12, 2001) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

TABLE 1

| | Kind of noble metal | Amount of noble metal (g/l.) | Amount of $CeO_2$ (g/l.) | Rate of Pt on $CeO_2$ (%) | Ratio between $CeO_2$ in inner layer and $CeO_2$ in outer layer | Amount of BaO (g/l.) | Amount of MgO (g/l.) | Amount of $Na_2O$ (g/l.) | Amount of $Cs_2O$ (g/l.) | Amount of $K_2O$ (g/l.) |
|---|---|---|---|---|---|---|---|---|---|---|
| Example 1 | Pt | 2.35 | 28 | 18 | — | 20 | 5 | — | — | — |
| Example 2 | Pt, Rh | 2.82 | 28 | 18 | — | 20 | 5 | — | — | — |
| Example 3 | Pt, Rh | 2.82 | 28.2 | 18 | 1:1 | 20 | 5 | — | — | — |
| Example 4 | Pt, Rh | 2.82 | 28.2 | 18 | 0.97:0.03 | 20 | 5 | — | — | — |
| Example 5 | Pt, Rh | 2.82 | 28.2 | 18 | 1:1 | 20 | 5 | 10 | — | — |
| Example 6 | Pt, Rh | 2.82 | 28.2 | 18 | 1:1 | 10 | 5 | — | 20 | — |
| Example 7 | Pt, Rh | 2.82 | 28.2 | 18 | 1:1 | 20 | 5 | — | — | 20 |
| Example 8 | Pt, Rh | 2.82 | 28.2 | 18 | 1:1 | 10 | 5 | 5 | 20 | — |
| Example 9 | Pt, Rh | 2.82 | 28.2 | 18 | 1:1 | 20 | 5 | 5 | — | 20 |
| Example 10 | Pt, Rh | 2.82 | 28.2 | 18 | 1:1 | 10 | 5 | — | 10 | 10 |
| Example 11 | Pt, Rh | 2.82 | 28.2 | 18 | 1:1 | 10 | 5 | 5 | 10 | 10 |
| Example 12 | Pt, Rh | 2.82 | 28.2 | 18 | 1:1 | 20 | 5 | — | — | — |
| Example 13 | Pt, Rh | 2.82 | 28.2 | 18 | 0.97:0.03 | 20 | 5 | — | — | — |
| Example 14 | Pt, Rh | 2.82 | 28.2 | 18 | 1:1 | 20 | 5 | 10 | — | — |
| Example 15 | Pt, Rh | 2.82 | 28.2 | 18 | 1:1 | 10 | 5 | — | 20 | — |
| Example 16 | Pt, Rh | 2.82 | 28.2 | 18 | 1:1 | 20 | 5 | — | — | 20 |
| Example 17 | Pt, Rh | 2.82 | 28.2 | 18 | 1:1 | 10 | 5 | 5 | 20 | — |
| Example 18 | Pt, Rh | 2.82 | 28.2 | 18 | 1:1 | 20 | 5 | 5 | — | 20 |
| Example 19 | Pt, Rh | 2.82 | 28.2 | 18 | 1:1 | 10 | 5 | — | 10 | 10 |
| Example 20 | Pt, Rh | 2.82 | 28.2 | 18 | 1:1 | 10 | 5 | 5 | 10 | 10 |

TABLE 2

| | Kind of noble metal | Amount of noble metal (g/l.) | Amount of $CeO_2$ (g/l.) | Rate of Pt on $CeO_2$ (%) | Ratio between $CeO_2$ in inner layer and $CeO_2$ in outer layer | Amount of BaO (g/l.) | Amount of MgO (g/l.) | Amount of $Na_2O$ (g/l.) | Amount of $Cs_2O$ (g/l.) | Amount of $K_2O$ (g/l.) |
|---|---|---|---|---|---|---|---|---|---|---|
| Compar. Example 1 | Pd, Rh | 2.82 | 28.2 | 18 | 1:1 | 20 | 5 | — | — | — |
| Compar. Example 2 | Pt, Rh | 2.82 | 28.2 | 4 | 1:1 | 20 | 5 | — | — | — |
| Compar. Example 3 | Pt, Rh | 2.82 | 28.2 | 51 | 1:1 | 20 | 5 | — | — | — |
| Compar. Example 4 | Pt, Rh | 2.82 | 2 | 10 | 1:1 | 20 | 5 | — | — | — |

TABLE 2-continued

| | Kind of noble metal | Amount of noble metal (g/l.) | Amount of CeO$_2$ (g/l.) | Rate of Pt on CeO$_2$ (%) | Ratio between CeO$_2$ in inner layer and CeO$_2$ in outer layer | Amount of BaO (g/l.) | Amount of MgO (g/l.) | Amount of Na$_2$O (g/l.) | Amount of Cs$_2$O (g/l.) | Amount of K$_2$O (g/l.) |
|---|---|---|---|---|---|---|---|---|---|---|
| Compar. Example 5 | Pt, Rh | 2.82 | 101 | 20 | 1:1 | 20 | 5 | — | — | — |
| Compar. Example 6 | Pt, Rh | 1.30 | 28.2 | 18 | 1:1 | 20 | 5 | — | — | — |
| Compar. Example 7 | Pt, Rh | 2.82 | 28.2 | 18 | 1:1.3 | 20 | 5 | — | — | — |
| Compar. Example 8 | Pt, Rh | 2.82 | 28.2 | 18 | 1:1 | 4 | 0.9 | — | — | — |
| Compar. Example 9 | Pt, Rh | 2.82 | 28.2 | 18 | 1:1 | 31 | 11 | — | — | — |
| Compar. Example 10 | Pt, Rh | 2.82 | 28.2 | 18 | 1:1 | 4 | 0.9 | 0.4 | — | — |
| Compar. Example 11 | Pt, Rh | 2.82 | 28.2 | 18 | 1:1 | 31 | 11 | 21 | — | — |
| Compar. Example 12 | Pt, Rh | 2.82 | 28.2 | 18 | 1:1 | 4 | 0.9 | — | 4 | — |
| Compar. Example 13 | Pt, Rh | 2.82 | 28.2 | 18 | 1:1 | 31 | 11 | — | 31 | — |
| Compar. Example 14 | Pt, Rh | 2.82 | 28.2 | 18 | 1:1 | 4 | 0.9 | — | — | 0.4 |
| Compar. Example 15 | Pt, Rh | 2.82 | 28.2 | 18 | 1:1 | 31 | 11 | — | — | 31 |
| Compar. Example 16 | Pt, Rh | 2.82 | 28.2 | 18 | 1:1 | 4 | 0.9 | 0.4 | 4 | — |
| Compar. Example 17 | Pt, Rh | 2.82 | 28.2 | 18 | 1:1 | 31 | 11 | 21 | 31 | — |
| Compar. Example 18 | Pt, Rh | 2.82 | 28.2 | 18 | 1:1 | 4 | 0.9 | 0.4 | — | 0.4 |
| Compar. Example 19 | Pt, Rh | 2.82 | 28.2 | 18 | 1:1 | 31 | 11 | 21 | — | 31 |
| Compar. Example 20 | Pt, Rh | 2.82 | 28.2 | 18 | 1:1 | 4 | 0.9 | — | 4 | 0.4 |
| Compar. Example 21 | Pt, Rh | 2.82 | 28.2 | 18 | 1:1 | 31 | 11 | — | 31 | 31 |
| Compar. Example 22 | Pt, Rh | 2.82 | 28.2 | 18 | 1:1 | 4 | 0.9 | 0.4 | 4 | 0.4 |
| Compar. Example 23 | Pt, Rh | 2.82 | 28.2 | 18 | 1:1 | 31 | 11 | 21 | 31 | 31 |

TABLE 3

| | NOx conversion rate (%) | | | |
|---|---|---|---|---|
| | After durability test | After sulfur-poisoning treatment | After sulfur-releasing treatment | Recovery rate (%) |
| Example 1 | 90.2 | 75.4 | 82.3 | 91.2 |
| Example 2 | 92.6 | 76.5 | 87.4 | 94.4 |
| Example 3 | 95.1 | 80.1 | 91.7 | 96.4 |
| Example 4 | 98.0 | 81.1 | 92.5 | 94.4 |
| Example 5 | 97.2 | 81.0 | 92.3 | 95.0 |
| Example 6 | 97.8 | 79.2 | 93.0 | 95.1 |
| Example 7 | 98.2 | 80.5 | 92.2 | 93.9 |
| Example 8 | 98.5 | 80.3 | 93.4 | 94.8 |
| Example 9 | 98.7 | 81.2 | 93.3 | 94.5 |
| Example 10 | 99.1 | 82.0 | 93.2 | 94.0 |
| Example 11 | 99.3 | 82.2 | 93.3 | 94.0 |
| Example 12 | 96.1 | 81.1 | 92.8 | 96.6 |
| Example 13 | 98.9 | 82.0 | 94.1 | 95.1 |
| Example 14 | 98.1 | 82.1 | 94.0 | 95.8 |
| Example 15 | 98.6 | 79.9 | 94.2 | 95.5 |
| Example 16 | 99.1 | 81.3 | 93.2 | 94.0 |
| Example 17 | 99.2 | 82.0 | 94.0 | 94.8 |
| Example 18 | 99.5 | 83.1 | 94.5 | 95.0 |
| Example 19 | 99.5 | 82.8 | 94.0 | 94.8 |
| Example 20 | 99.6 | 82.9 | 94.3 | 94.7 |

TABLE 4

|  | NOx conversion rate (%) | | | |
| --- | --- | --- | --- | --- |
|  | After durability test | After sulfur-poisoning treatment | After sulfur-releasing treatment | Recovery rate (%) |
| Compar. Example 1 | 92.2 | 68.1 | 72.3 | 78.4 |
| Compar. Example 2 | 95.3 | 81.2 | 85.5 | 89.7 |
| Compar. Example 3 | 85.2 | 65.4 | 83.2 | 97.7 |
| Compar. Example 4 | 94.2 | 80.7 | 83.1 | 88.2 |
| Compar. Example 5 | 83.1 | 63.0 | 80.9 | 97.4 |
| Compar. Example 6 | 92.1 | 62.2 | 70.8 | 76.9 |
| Compar. Example 7 | 84.2 | 62.5 | 80.3 | 95.4 |
| Compar. Example 8 | 80.0 | 62.7 | 72.5 | 90.6 |
| Compar. Example 9 | 94.3 | 82.0 | 83.1 | 88.1 |
| Compar. Example 10 | 82.2 | 63.9 | 72.0 | 87.6 |
| Compar. Example 11 | 95.1 | 82.2 | 83.2 | 87.5 |
| Compar. Example 12 | 83.1 | 62.8 | 72.2 | 86.9 |
| Compar. Example 13 | 95.9 | 82.1 | 83.3 | 86.9 |
| Compar. Example 14 | 83.0 | 61.7 | 71.2 | 85.8 |
| Compar. Example 15 | 95.7 | 82.0 | 81.8 | 85.5 |
| Compar. Example 16 | 85.4 | 63.1 | 73.7 | 86.3 |
| Compar. Example 17 | 96.4 | 83.0 | 85.6 | 88.9 |
| Compar. Example 18 | 85.2 | 63.0 | 73.3 | 86.0 |
| Compar. Example 19 | 96.2 | 82.3 | 85.0 | 88.4 |
| Compar. Example 20 | 85.3 | 63.4 | 73.7 | 86.4 |
| Compar. Example 21 | 96.4 | 81.7 | 84.4 | 87.6 |
| Compar. Example 22 | 85.5 | 64.3 | 73.8 | 86.3 |
| Compar. Example 23 | 96.9 | 82.0 | 83.1 | 85.8 |

What is claimed is:

1. A NOx reduction catalyst for exhaust gas discharged from a combustion device operable in a lean region and in a range including a stoichiometric region and a rich region, the NOx reduction catalyst comprising:
   a refractory inorganic substrate;
   a catalytic noble metal;
   a NOx absorbing material which is a metal comprising barium and magnesium, supported on said refractory inorganic substrate, at least a part of said metal comprising barium and magnesium forms a double carbonate represented by the following general formula:

$Ba_xMg_y(CO_3)_2$ where x and y are atom ratios in which x=0.5 to 1.999; y=0.001 to 1.5; and x+y=2.0; and
      an oxygen adsorbable and releasable material which carries at least a part of said catalytic noble metal,
      wherein said catalytic noble metal carried on the oxygen adsorbable and releasable material adsorbs SOx in the exhaust gas, in a form of at least one of sulfate and sulfite.

2. A NOx reduction catalyst as claimed in claim 1, wherein said catalytic noble metal includes platinum.

3. A NOx reduction catalyst as claimed in claim 1, further comprising at least one metal selected from the group consisting of alkali metal, alkali earth metal other than barium and magnesium and rare earth metal, wherein said at least one metal adsorbs NOx in exhaust gas in the lean region and reduces the adsorbed NOx info nitrogen in the range including the stoichiometric region and the rich region.

4. A NOx reduction catalyst as claimed in claim 1, wherein said catalytic noble metal includes rhodium.

5. A NOx reduction catalyst as claimed in claim 1, wherein said combustion device is an internal combustion engine.

6. A NOx reduction catalyst as claimed in claim 1, wherein said combustion device is a combustor.

7. A NOx reduction catalyst for exhaust gas discharged from a combustion device operable in a lean region and in a range including a stoichiometric region and a rich region, the NOx reduction catalyst comprising:
   a refractory inorganic substrate;
   a first catalytic coat layer including a catalytic noble metal, a NOx absorbing material which is a metal comprising barium and magnesium, supported on said refractory inorganic substrate, at least a part of said metal comprising barium and magnesium forms a double carbonate represented by the following general formula:

$Ba_xMg_y(CO_3)_2$ where x and y are atom ratios in which x=0.5 to 1.999; y=0.001 to 1.5; and x+y=2.0, and an oxygen adsorbable and releasable material which carries at least a part of said catalytic noble metal, wherein said catalytic noble metal carried on the oxygen adsorbable and releasable material adsorbs SOx in the exhaust gas, in a form of at least one of sulfate and sulfite; and
      a second catalytic coat layer formed on said first catalytic coat layer, exhaust gas flowing though a position nearer to said second catalytic coat layer than to said first catalytic coat layer, said second catalytic coat layer including a catalytic noble metal, a NOx absorbing material which is a metal selected form the group consisting of barium and magnesium, supported on said refractory inorganic substrate, at least a part of said metal selected from the group consisting of barium and magnesium forms a double carbonate represented by the following general formula:

$Ba_xMg_y(CO_3)_2$ where x and y are atom ratios in which x=0.5 to 1.999; y=0.001 to 1.5; and x+y=2.0, and an oxygen adsorbable and releasable material which carries at least a part of said catalytic noble metal, wherein said catalytic noble metal carried on the oxygen adsorbable and releasable material adsorbs SOx in the exhaust gas, in a form of at least one of sulfate and sulfite, wherein said oxygen adsorbable and releasable material included in said first catalytic coat layer is larger in amount than said oxygen adsorbable and releasable material included in said second catalytic coat layer.

8. A NOx reduction catalyst as claimed in claim 7, wherein a weight ratio between said oxygen adsorbable and releasable material in said second catalytic coat layer and said oxygen adsorbable and releasable material in said first catalytic coat layer is within a range of from 0.01:0.99 to 1:1.

9. A NOx reduction catalyst as claimed in claim 7, wherein rhodium is included only in said second catalytic coat layer.

10. A NOx reduction catalyst for exhaust gas discharged from a combustion device operable in a lean region and in a range including a stoichiometric region and a rich region, the NOx reduction catalyst comprising:

a refractory inorganic substrate;

at least one catalytic noble metal selected from the group consisting of platinum and rhodium, supported on said refractory inorganic substrate;

a NOx adsorbing material which is a metal comprising barium and magnesium, supported on said refractory inorganic substrate, at least a portion of said metal comprising barium and magnesium forms a double carbonate represented by the following general formula:

$$Ba_xMg_y(CO_3)_2$$

where x and y are atom ratios in which x=0.5 to 1.999; y=0.001 to 1.5; and x+y=2.0;

an oxygen adsorbable and releasable material including ceria and supported on said refractory inorganic substrate, said oxygen adsorbable and releasable material carrying at least a part of said catalytic noble metal;

wherein said catalytic noble metal carried on said oxygen adsorbable an releasable material adsorbs SOx in the exhaust gas, in the form of at least one of sulfate an sulfite.

11. A NOx reduction catalyst as claimed in claim 10, further comprising at least one metal selected from the group consisting of sodium, cesium and potassium, supported on said refractory inorganic substrate.

12. A NOx reduction catalyst as claimed in claim 11, wherein said sodium is contained in a form of sodium oxide in an amount ranging from 0.5 to 20.0 g per one liter of said substrate.

13. A NOx reduction catalyst as claimed in claim 11, wherein said cesium is contained in a form of cesium oxide in an amount ranging from 5 to 30 g per one liter of said substrate.

14. A NOx reduction catalyst as claimed in claim 11, wherein said potassium is contained in a form of potassium oxide in an amount ranging from 5 to 30 g per one liter of said substrate.

15. A NOx reduction catalyst as claimed in claim 10, where said ceria is contained in an amount ranging from 3 to 100 g per one liter of said substrate.

16. A NOx reduction catalyst as claimed in claim 10, wherein said at least one catalytic noble metal is contained in an amount ranging from 1.4 to 4.3 g per one liter of said substrate.

17. A NOx reduction catalyst as claimed in claim 10, wherein said ceria is combined with zirconium to form a double oxide.

18. A NOx reduction catalyst as claimed in claim 10, wherein said barium and said magnesium are contained respectively in an amount ranging from 5 to 30 g in a form of barium oxide and in an amount ranging from 1 to 10 g in a form of magnesium oxide per one liter of said substrate.

19. A NOx reduction catalyst for exhaust gas discharged from a combustion device operable in a lean region and in a range including a stoichiometric region and a rich region, the NOx reduction catalyst comprising:

a refractory inorganic substrate;

a catalytic noble metal including platinum;

a NOx absorbing material which is a metal comprising barium and magnesium, supported on said refractory inorganic substrate, at least a part of said metal comprising barium and magnesium forms a double carbonate represented by the following general formula:

$$Ba_xMg_y(CO_3)_2$$

where x and y are atom ratios in which x=0.5 to 1.999; y=0.001 to 1.5; and x+y=2.0; and an oxygen adsorbable and releasable material which carries at least a part of said catalytic noble metal, said oxygen adsorbable and releasable material including ceria which carries platinum in an amount ranging from 5 to 50% by weight of a whole amount of platinum contained in said NOx reduction catalyst, wherein said platinum carried on said ceria adsorbs SOx in the exhaust gas, in a form of at least one of sulfate and sulfite.

20. A NOx reduction system for exhaust gas discharged from a combustion device operable in a lean region and in a range including a stoichiometric region and a rich region, the NOx reduction system comprising:

a refractory inorganic substrate;

a NOx reduction catalyst including a catalytic noble metal, a NOx absorbing material which is a metal comprising barium and magnesium, supported on said refractory inorganic substrate, at least a part of said metal comprising barium and magnesium forms a double carbonate represented by the following general; formula:

$$Ba_xMg_y(CO_3)_2$$

where x and y are atom ratios in which x=0.5 to 1.999; y=0.001 to 1.5; and x+y=2.0, and an oxygen adsorbable and releasable material which carries at least a part of said catalytic noble metal, wherein said catalytic noble metal carried on the oxygen adsorbable and releasable material adsorbs SOx in the exhaust gas, in a form of at least one of sulfate and sulfite; and a device for controlling an air-fuel (air/fuel) ratio of an air-fuel mixture to be supplied to the combustion device, within a range of not smaller than 15 in the lean region.

21. A NOx reduction system for exhaust gas discharged from a combustion device operable in a lean region and in a range including a stoichiometric region and a rich region, the NOx reduction system comprising:

a refractory inorganic substrate;

an exhaust gas passageway through which exhaust gas from the combustion device flows;

a NOx reduction catalyst disposed in said exhaust gas passageway and including a catalytic noble metal, a NOx absorbing material which is a metal comprising barium and magnesium, supported on said refractory inorganic substrate, at least a part of said metal comprising barium and magnesium forms a double carbonate represented by the following general formula:

$$Ba_xMg_y(CO_3)_2$$

where x and y are atom ratios in which x=0.5 to 1.999; y=0.001 to 1.5; and x+y=2.0, and an oxygen adsorbable and releasable material which carries at least a part of said catalytic noble metal, wherein said catalytic noble metal carried on the oxygen adsorbable and releasable material adsorbs SOx in the exhaust gas, in a form of at least one of sulfate and sulfite; and a device for causing secondary air to flow into said exhaust gas passageway upstream of said NOx reduction catalyst in the range including the stoichiometric region and the rich region.

22. A method of reducing $NO_x$ in exhaust gas discharged from a combustion device which is operable in a lean region and in a range including a stoichiometric region and a rich region, said method comprising:

providing the combustion device with a $NO_x$ reduction catalyst including a refractory inorganic substrate, a catalytic noble metal, a NOx absorbing material which is a metal comprising barium and magnesium, supported on said refractory inorganic substrate, wherein at least a part of said metal comprising barium and magnesium forms a double carbonate represented by the following general formula:

$$Ba_xMg_y(CO_3)_2$$

where x and y are atom ratios in which x=0.5–1.999, y=0.001–1.5; and x+y=2, and an oxygen adsorbable and releasable material which carries at least a part of said catalytic noble metal; and causing exhaust gas to flow through the NOx reduction catalyst to allow the catalytic noble metal carried on the oxygen adsorbable and releasable material to adsorb SOx in the exhaust gas, in a form of at least one of sulfate and sulfite.

* * * * *